Feb. 17, 1942.    O. BAILER    2,273,612
NONINTERRUPTED-CURRENT MULTIPLE CIRCUIT CONTROLLER
Filed Feb. 24, 1941    2 Sheets—Sheet 2
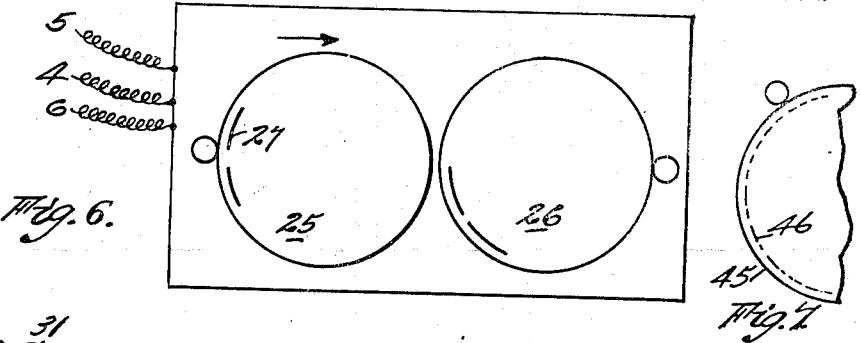
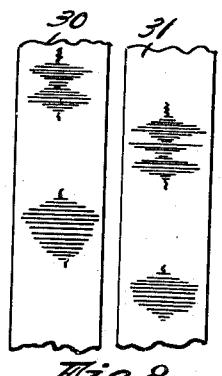
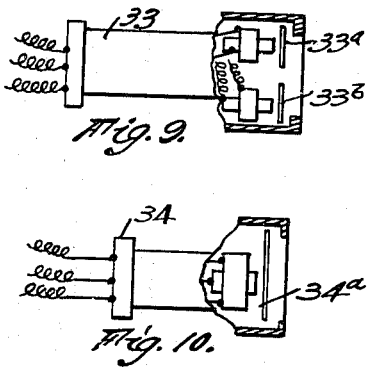
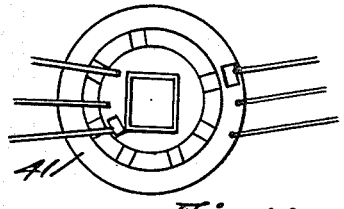
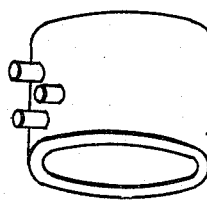
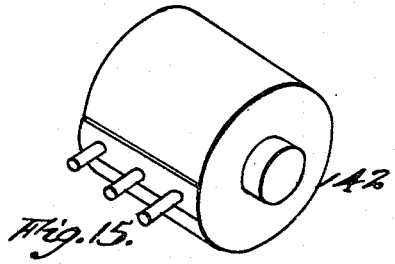
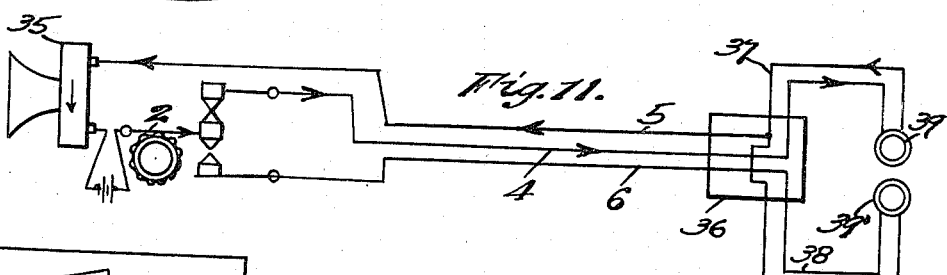
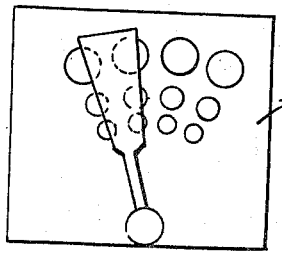
Inventor,
O. Bailer;
By his Attorney,
Frederick E. Maynard Patented Feb. 17, 1942

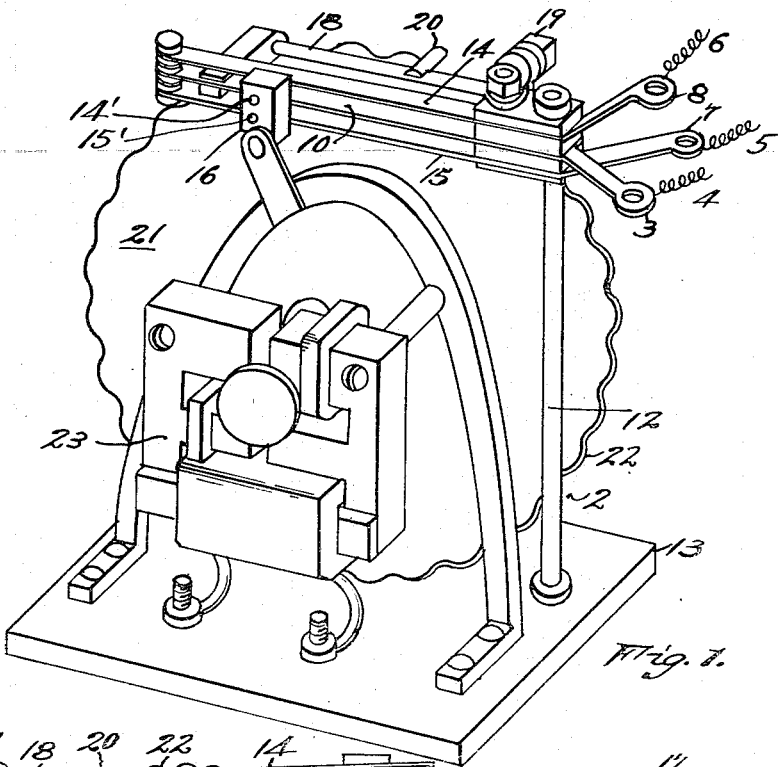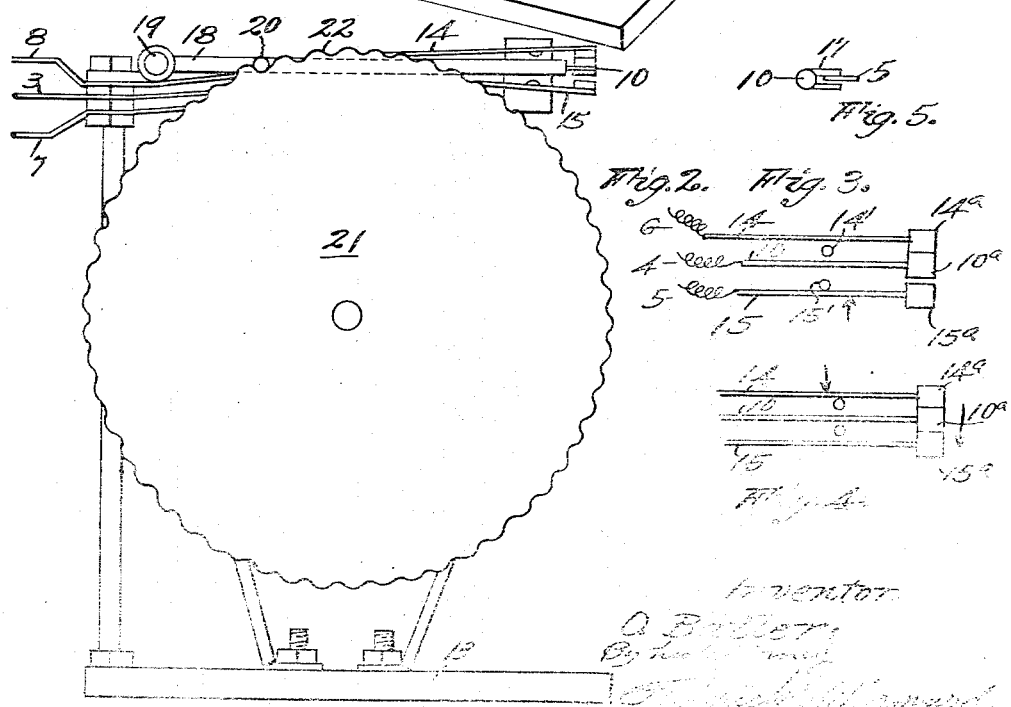

2,273,612

UNITED STATES PATENT OFFICE 2,273,612

NONINTERRUPTED-CURRENT MULTIPLE CIRCUIT CONTROLLER

Otto Bailer, Los Angeles, Calif.

Application February 24, 1941, Serial No. 380,405

7 Claims. (Cl. 179—1.5)

This invention is current controller, and may be called a "wavecillator," in that it has to do with the constant, automatic switching of power wave-energy, of any adaptable nature, from one vehicle to another like vehicle over or along which the wave-energy may be transmitted; the function of the controller being to alternately throw the energy, hereinafter called the current, back and forth from one vehicle to the other so that instead of there being a continuous flow of the current in a vehicle the flow will be broken into completely spaced spurts in each vehicle but at the same time if two or more of the vehicles are combined with the controller the collection of vehicles, as a whole, will be constantly energized to effect an ultimate desired resultant.

For instance, an object of the invention is to provide for the utilization of two or more wired or wireless circuits each of which may be separately energized by appreciably differentiated power current frequencies, and to provide an automatic means continuously operative to swing the current to and fro in a predetermined manner between the several circuits in the hook-up without the complete cessation of the flow in the system as a whole at any one time whilst the controller is in operation.

It is an object of the invention to provide a system for the secret transmission of messages, in code or not, by wire or by radio, by the use of power frequencies of desired difference and which power impulses are, in each frequency, sent in distinctly spaced spurts, and which separate power currents are adapted to be suitably employed, either at place of origin or at one or more places of reception, in any number of ways in which such power currents are now used in well known manners; as in wire or radio telephony, or the making of sound and/or light impulse records.

The word "spurts" is here used in connection with the sending of the power energy in spaced volumes to avoid confusion with various common expression and technical expressions having to do with electric current factors, and is intended to be understood as surges of current, and it is an object to provide means for the positive timing and length of the surges so that a practical, simple and reliable system of selective and interchangeable master switch members may be devised in accordance with the given use to which the controller may be placed, and which members may be differentiated on the basis, for instance, of whether for low, medium or high frequency power currents.

It is an object to provide a controller of this kind which may be readily and effectively operated by a standard 60-cycle, 110-volt motor, or other desired speed, so that words as of a telephoned message may each be chopped into any desired number of fractions (regardless of syllables) and so diverted to the plurality of vehicles employed in the system.

An object is to provide for the continuous passage of a plurality of unrelated messages or current trains over the plurality of vehicles or systems employed in the operation of but the one system needed for transmission of but one current train alone. That is, an object is to provide for use of the space period of time that lapses between the successive surges of power on each individual vehicle during transition of but one message or power train.

A further object of the invention is to provide a current surge controlling instrument for effective combination in various electrical systems in which there may be employed divers devices as for instance in circuits provided with condensers, transformers, resistors, bridges, oscillators, capacitors for co-ordination of current surges in time, length and sequence relation.

The invention consists in certain advancements in this art as set forth in the ensuing disclosure and having, with the above, additional objects and advantages as hereinafter developed, and whose constructions, combinations and details of means will, with the manner of operation, be made manifest in the following description of the herewith illustrative apparatus; it being understood that modifications, variations and adaptations may be resorted to within the spirit, scope and principle of the invention as it is more particularly claimed presently.

Figure 1 is a rear perspective of the controller.
Figure 2 is a front elevation of the controller.
Figures 3 and 4 are detail views of two positions of the triple arm contact device of the controller.
Figure 5 is an end view of the throw lever of the motivated switch arm.
Figure 6 is a schematic, two plate record device for transmitting or receiving messages, and Figure 7 is plan of an interrupted type of message record. Figure 8 is plan of a plurality of strip records each having interrupted record tracks of one given message. Figure 9 is a diagrammatic view of a multiple diaphragm telephone receiver for incoming message over a multiplicity of co-ordinated circuits incorporating the instant controller. Figure 10 is a diagram of a single diaphragm receiver combined with a plurality of co-ordinate circuits. Figure 11 is a diagram of a telephone system having co-ordinate circuits each with a single receiver.

Figure 12 is a diagram of a triple pole attenuation box with which the present controller is combinable. Figures 13, 14 and 15 shows, respectively, a shielded transformer, a rheostat potentiometer, and a volume control with any of which the present controller may be combined for circuit control.

The controller 2 here shown has a contact bar 3 to which is attached what may be called the "hot" wire 4 of a wired system including a plurality of circuits of which wires 5 and 6 only are shown and which are connected to contact bars 7 and 8.

Means are provided for alternately throwing surges of a current which constantly energizes hot wire 4 to either of the coordinate wires 5 and 6. Therefore if a telephone message is being sent in the system neither of the circuits 4—5 or 4—6 would carry an intelligible message. But if suitable receiver or receivers are hooked in the separate message trains in the two circuits may be either intelligently heard or any suitable record may be made of the message.

The hot bar 3 is electrically connected to a motivated, resilient switch bar or arm 10 insulatedly and suitably supported in a mounting block 11, suitably rigidly attached as by a post 12 to a base 13. Extending longitudinally above and spaced from the arm 10 is a resilient switch arm 14 electrically connected to the contact bar 8, of wire 6. Extending longitudinally below and spaced from the arm 10 is a resilient switch arm 15 mounted on the insulating block 11 and connecting with the bar 3 of wire 4.

The upper switch arm 14 normally rests in a stopped position against a subjacent pin 14' fixed on a rigidly supported insulator 16, and the lower switch arm 15 normally rests in a stopped position against a superjacent pin 15', on the insulator 16.

Referring to Figs. 3 and 4, the intermediate arm 10 is seen spaced between the pins 14' and 15' for free motivation and its outer end has a contact head 10a which has constant contact at one period of time with a head 14a of arm 14 and head 15a of arm 15 so that for a brief period of time energizing current flows in the multiplicity of circuits combined in the hook-up at the same instant. In Fig. 3 the head 10a has lifted the head 14a from its stop 14' and is therefore closing a circuit only by way of wires 4—6 to any instrumentality adaptable for a desired ultimate result in the circuit. As the motivating arm 10 moves down to position of Fig. 4 the arm 14 is arrested on stop 14' but before this occurs the head 10a meets the head 15a and closes the circuit in wires 4—5 whilst still closing circuit 4—6. When the arm 14 is arrested on pin 14' and the main arm 10 moves on downwardly circuit 4—6 is broken and only circuit 4—5 is now energized. Thus the oscillating main switch arm 10 throws the current flow to and fro between the plural circuits incorporated in the system, and the surges in each makes in neither circuit alone any intelligible message.

The arm 10 is shown in Fig. 5 as engaged in a yoke 17 of a lever 18 pivoted at 19 in the block 11 and the lever is provided with a rider 20 which constantly bears on a cam disc 21 whose rim is suitably serrated or toothed at 22 whereby to effect a controlled oscillating action of the lever 18 and thereby the motivated switch arm 10. It will be understood that the number and degree of the cam teeth 22 is wholly arbitrary and determined as to speed and period of oscillations more or less by the nature of the current or frequencies thereof in the concerned system; low speed for low rate of successive current impulses, and vice versa. It will be readily understood that multiple messages or trains of surges, unrelated one to the other, may be sent at the same time if the two messages are inter-surged on the circuits; that is if in the unused intervals of time on each wire 5 and 6 in the sending of one message, surges of another message are interposed in synchronism.

Sending and reception of the isolated trains of surges of fluid may be readily effected and synchronization established by the employment of any suitable prime electric motor 23 to the shaft of which the cam disc 21 is secured.

In Fig. 6 is shown a set of synchronized records 25 and 26 each having an interrupted record line 27 as produced in any suitable manner from interrupted trains of impulses as from lines of circuit wires 4—5—6. Neither record track or line 27 is alone intelligible but if the two tracks are adjusted as by knob control 28 so that the combined trains are interlaced as one record then the message, whatever its sending form, becomes intelligible.

In Fig. 8 is shown a plurality of photographic telephone record strips 30 and 31, as produced in a well known manner by photo-electric apparatus; in this case the separate strips each having been run in a respective apparatus receiving but one train of current surges as determined by the operation of the instant controller 2. A composite made from the two strips 30 and 31 will produce a complete or intelligible message.

The two separate circuits 4—5 and 4—6 may separately be brought into a single receiver 33, Fig. 9, having independent circuit diaphragms 33a and 33b so that as the two trains or surges excite the diaphragms the resultant sound will be an intelligible message. In this form the two circuits 4—5 and 4—6 may be greatly spread apart in installation; but in any case if either circuit alone is tapped no sense can be made of the interrupted-surge message.

The two widely separated circuit installations 4—5 and 4—6 may be brought together in a receiver 34 having one diaphragm 34a to whose magnet the two circuits may be tapped so that the magnet will be continuously energized by the composited trains of surges from the two separate circuits.

A complete sending set 35, Fig. 11 is connected to a controller 2 and this throws the message into two circuits 4—5 and 4—6 connected to a station distributor 36 from which extend two separate exchange circuits 37 and 38 each of which may have its own call number and its own receiver 39—39'. One individual may listen on the two receivers at the same moment and would receive an intelligible message, but the voice on one receiver alone would be unintelligible for message purpose.

This controller may be combined with many types of well known electrical instruments having their special functions in divers electrical systems and there are here shown as an example a rheostat potentiometer 40, a shielded transformer 41, and a volume control 42, and an attenuation box 43.

In Fig. 7 there is shown a portion of a single record disc 45 on which is depicted spaced record tracks 46 of surges on a given circuit, as 4—5. In this case the spaced surges of current in the related circuit 4—6 are imposed in the same track line as 46 but on the blanks in the track not impressed by the other circuit impulse flow. The two related tracks may be made at one and the same time or at different times of any lapsed period.

It is within the purview of this invention that the trains of impulses or surges may be originated in any suitable and practical manner, directly or indirectly, and may likewise be received and ultimately translated in any suitable manner.

It is understood that this controller may be attached to an oscillator in any apparatus using a plurality of selectable frequency imputs for the automatic control of current flow to different elements in the apparatus.

What is claimed is:

1. In an apparatus of the class described, a plurality of circuits having a common hot wire, and a means including a vibrating switch for selectively throwing in circuit with the hot wire either of the other circuit wires and breaking the circuit flow to the remainder and having a circuit closure part for keeping overlapping current flow in all circuits for a period of time before break in each circuit.

2. In an apparatus of the class described, a plurality of circuit channels having a common exciting source, and a means for controlling current flow in the circuits thereof and including a switch member electrically connected to said source, and drive means to oscillate said member to contact with and throw current to either of the other channels and including means to maintain flow of current in all channels until selection of one has been completed, and the other broken to avoid breaking the source flow, and said drive means including a rotary, toothed, non-conducting cam to vibrate the switch during one rotation of the cam.

3. A circuit controller including a rotary cam device having a system of non-conductive code teeth, a non-conducting member oscillated by the teeth of said device, and a plurality of repressible, resilient switch elements one of which is a controller actuated by said member to engage alternately with the other elements to make and break their circuits.

4. The controller of claim 3; the said controller element being in constant flow relation to an associated current channel and having means to alternately close circuits of the other elements concurrently so that there is no full break in current flow on the actuated element whilst either of the other elements are in open circuit position.

5. The controller of claim 3; the said controller element being in constant flow relation to an associated channel and having means to effect an alternate selection of the other elements for circuit closing and maintain continuity of flow through the controller.

6. Means for the control of various electrical currents to a plurality of carrier channels so that the current may be made to excite each channel in disjunctive spurts or in a given code adaptation, and including a toothed actuator, a non-circuit oscillator motivated by the actuator, a set of resilient switches—one for each channel—and a master switch to the common source of the current and which includes means to engage with the said channel switches and maintain circuit to all at one time for a period during which the master switch is moving to open one channel and close the other, and which master switch is vibrated by the oscillator.

7. In an apparatus of the class described; an oscillator, a rotary actuator having a system of motivating teeth for motivating the oscillator, a master switch member actuated by the oscillator, and a plurality of resilient and repressive switches for relative separate channel control; said master switch having a source of current and being operative to maintain flow of current concurrently to the channel switches in periods between it opening and closing of the separate channels.

OTTO BAILER.